United States Patent [19]

Hunt et al.

[11] Patent Number: 5,125,022
[45] Date of Patent: Jun. 23, 1992

[54] METHOD FOR RECOGNIZING ALPHANUMERIC STRINGS SPOKEN OVER A TELEPHONE NETWORK

[75] Inventors: Alan K. Hunt, Carrollton; Thomas B. Schalk, Dallas, both of Tex.

[73] Assignee: VCS Industries, Inc. d/b/a Voice Control Systems, Dallas, Tex.

[21] Appl. No.: 566,519

[22] Filed: Aug. 10, 1990

Related U.S. Application Data

[63] Continuation-in-part of Ser. No. 523,486, May 15, 1990.

[51] Int. Cl.$^5$ ............................ G10L 9/08; H04M 1/66
[52] U.S. Cl. ...................................... 379/88; 379/189; 379/199; 381/42; 381/43
[58] Field of Search ...................... 381/42, 43; 379/88, 379/91, 189, 199, 89

[56] References Cited

U.S. PATENT DOCUMENTS

| | | | |
|---|---|---|---|
| 4,363,102 | 12/1982 | Holmgren et al. | 364/513 |
| 4,694,493 | 9/1987 | Sakoe | 381/42 |
| 4,827,518 | 5/1989 | Feustel et al. | 381/42 |
| 4,910,782 | 3/1990 | Watari | 381/42 |

OTHER PUBLICATIONS

Jayant M. Naik, Lorin P. Netsch and George R. Doddington: Speaker Verification Over Long Distance Telephone Lines; May 1989 Int. Conference of Acoustic Speech and Signal Processing ("IEEE") pp. 524-527.
Herbert Gish; Robust Discrimination in Automatic Speaker Identification; 1990 Int. Conference of Acoustic Speech and Signal Processing; pp. 289-292.
Yifan Gong, Jean-Paul Haton; Text-Independent Speaker Recognition by Trajectory Space Comparison; 1990 Int. Conference of Acoustic Speech and Signal Processing, pp. 285-288.
Chi-Shi Liu, Wern-Jun Wang, Min-Tau Lin and Hsiao-Chuan Wang: Study of Line Spectrum Pair Frequencies for Speaker Recognition; 1990 Int. Conference of Acoustic Speech and Signal Processing: pp. 277-280.
Wang Ren-hua, He Lin-Shen, and Hiroya Fujisaki: A Weighted Distance Measure Based on the Fine Structure of Feature Space: Application to Speaker Recognition; 1990 Int. Conference of Acoustic Speech and Signal Processing; pp. 273-276.
Aaron E. Rosenberg, Chin-Hui Lee, and Frank K. Soong: Sub-Word Unit Talker Verification Using Hidden Markov Models; 1990 Int. Conference of Acoustic Speech and Signal Processing; pp. 269-272.
Younes Bennani, Francoise Fogelman Soulie and Patric Gallinari: A Connectionish Approach for Automatic
(List continued on next page.)

*Primary Examiner*—Thomas W. Brown
*Attorney, Agent, or Firm*—David H. Judson

[57] ABSTRACT

The present invention describes a method for recognizing alphanumeric strings spoken over a telephone network wherein individual character recognition need not be uniformly high in order to achieve high string recognition accuracy. Preferably, the method uses a processing system having a digital processor, an interface to the telephone network, and a database for storing a predetermined set of reference alphanumeric strings. In operation, the system prompts the caller to speak each character of a string, beginning with a first character and ending with a last character. Each character is then recognized using a speaker-independent voice recognition algorithm. The method calculates recognition distances between each spoken input character and the corresponding letter or digit in the same position within each reference alphanumeric string. After each character is spoken, captured and analyzed, each reference string distance is incremented and the process is continued, accumulating distances for each reference string, until the last character is spoken. The reference string with the lowest cumulative distance is then declared to be the recognized string.

10 Claims, 2 Drawing Sheets

OTHER PUBLICATIONS

Speaker Identification; 1990 Int. Conference of Acoustic Speech and Signal Processing; pp. 265-268.

J. Oglesby and J. S. Mason: Optimisation of Neural Models for Speaker Identification; 1990 Int. Conference of Acoustic Speech and Signal Processing; pp. 261-264.

Timothy C. Feustel and George A. Velius; Speaker Identify Verification Over Telephone Lines: Where we are and Where we are Going; 1989 ICCST, Zurich, Switzerland, pp. 181, 182.

George Velius: Variants of Cepstrum Based Speaker Identify Verification; 1988 Proceedings of ICASSP, pp. 1-4.

George R. Doddington: Speaker Recognition—Identifying People by Their Voices; Proceedings of the IEEE, vol. 73 No. 11, Nov. 1985, pp. 1651-1664.

Younes Bennani and Patrick Gallinari: On the use of TDNN-Extracted Features Information in Talker Identification; 1991 Int. Conference of Acoustic Speech and Signal Processing; pp. 385-387.

Michael J. Carey, Eluned S. Parris and John S. Bridle: A Speaker Verification System Using Alpha-Nets; 1991 Int. Conference of Acoustic Speech and Signal Processing; pp. 397-400.

R. C. Rose, J. Fitzmaurice, E. M. Hofstetter, and D. A. Reynolds: Robust Speaker Identification in Noisy Environments using Noise Adaptive Speaker Models; 1991 Int. Conference of Acoustic Speech and Signal Processing; pp. 401-404.

L. Xu, J. Oglesby and J. S. Mason: The Optimization of Perceptually-Based Features for Speaker Identification; Int. Conference of Acoustic Speech and Signal Processing; unknown date, pp. 520-523.

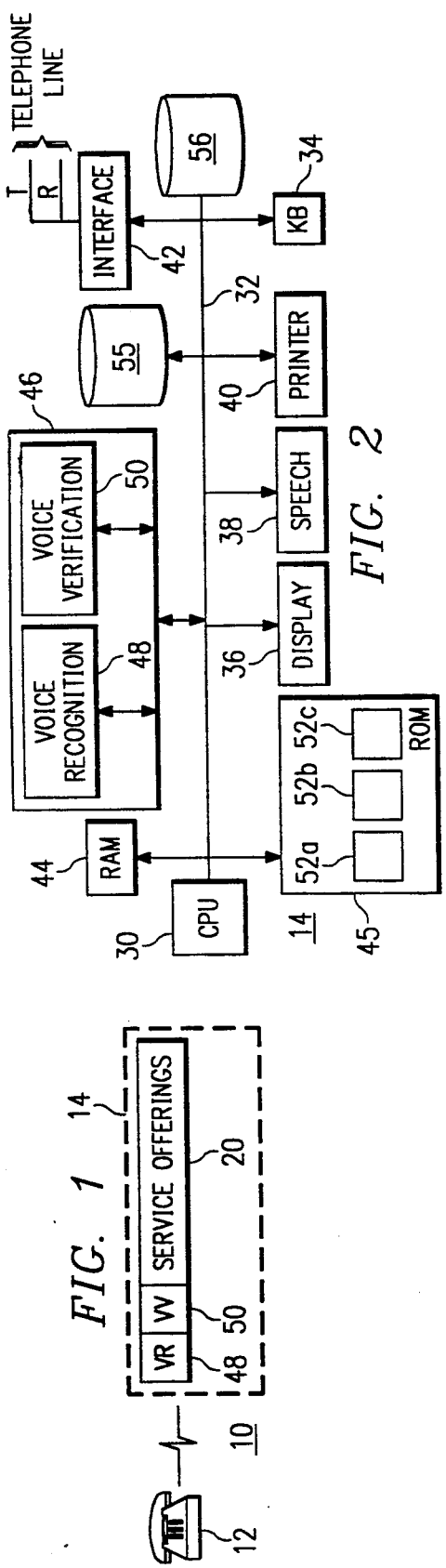
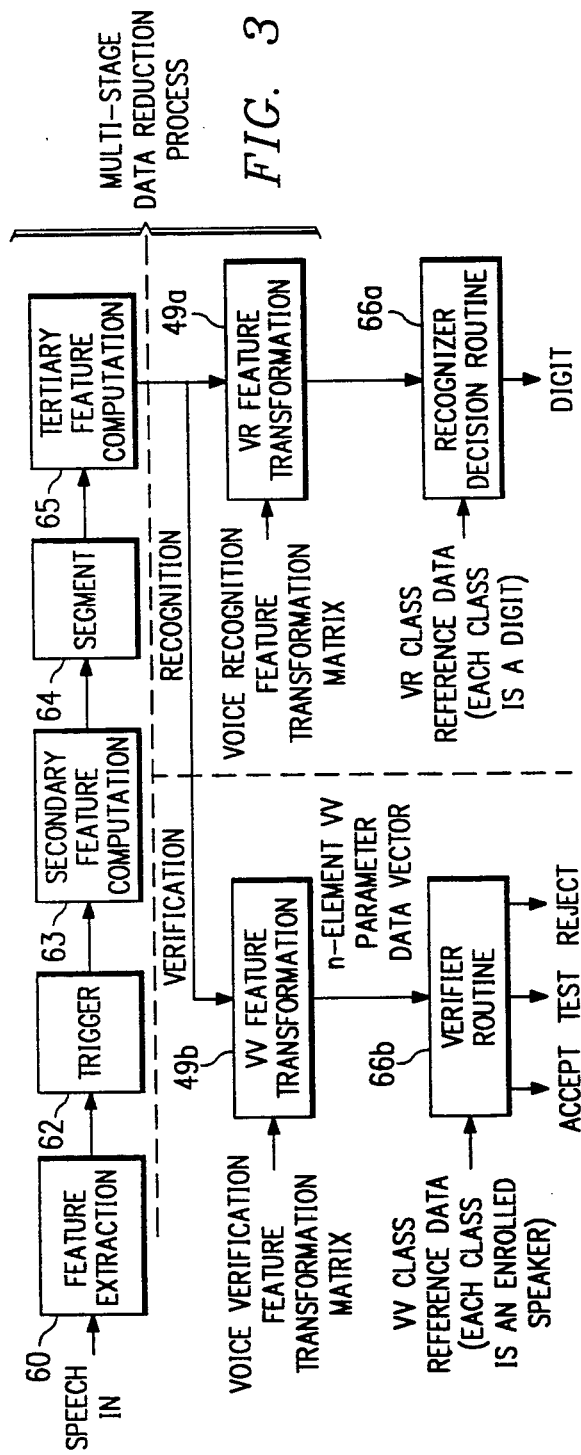

METHOD FOR RECOGNIZING ALPHANUMERIC STRINGS SPOKEN OVER A TELEPHONE NETWORK

This application is a continuation-in-part of prior copending U.S. patent application Ser. No. 07/523,486, filed May 15, 1990.

TECHNICAL FIELD

The present invention relates generally to voice recognition techniques and more specifically to a voice recognition/verification method and system for enabling a caller to obtain access to one or more services via a telephone network.

BACKGROUND OF THE INVENTION

Voice verification is the process of verifying a person's claimed identity by analyzing a sample of that person's voice. This form of security is based on the premise that each person can be uniquely identified by his or her voice. The degree of security afforded by a verification technique depends on how well the verification algorithm discriminates the voice of an authorized user from all unauthorized users.

It would be desirable to use voice verification schemes to verify the identity of a telephone caller. Such schemes, however, have not been successfully implemented. In particular, it has proven difficult to provide cost effective and accurate voice verification over a telephone network. Generally, this is because the telephone network is a challenging environment that degrades the quality of speech through the introduction of various types of noise and band-limitations. The difficulty in providing telephone based voice verification is further complicated by the fact that many types of microphones are used in conventional telephone calling stations. These microphones include carbon button handsets, electret handsets and electret speaker phones. Each of these devices possesses unique acoustic properties that affect the way a person's voice may sound over the telephone network.

Given the inherent limitations of the prior art as well as the poor frequency response of the telephone network, it has not been possible to successively integrate a voice recognition and verification system into a telephone network.

BRIEF SUMMARY OF THE INVENTION

It is an object of the present invention to recognize alphanumeric strings spoken over a telephone network.

It is another object of the invention to describe a method for recognizing alphanumeric strings wherein recognition occurs on the basis of an ensemble of alphanumeric characters as opposed to individual character recognition.

It is a thus a further object of the invention to describe a method for recognizing alphanumeric strings that does not require high individual character recognition accuracy to achieve recognition of a spoken alphanumeric string.

It is also an object of the present invention to provide a method and system for voice recognition and voice verification over a telephone network.

It is yet another object of the present invention to provide a method and system for enabling a caller to obtain access to one or more services via a telephone network using voice controlled access techniques.

It is still another object of the invention to provide simultaneous speaker-independent voice recognition and voice verification to facilitate access to services via a band limited communications channel.

It is another object of the invention to provide a method for verifying the claimed identity of an individual at a telephone to enable the individual to obtain access to services or privileges limited to authorized users.

In a preferred embodiment, these and other objects of the invention are provided in a method for enabling a caller to obtain access to services via a telephone network by entering a spoken password having a plurality of digits. Preferably, the method begins by prompting the caller to speak the password beginning with a first digit and ending with a last digit thereof. Each spoken digit of the password is then recognized using a speaker-independent voice recognition algorithm. Following entry of the last digit of the password, a determination is made whether the password is valid. If so, the caller's identity is verified using a voice verification algorithm.

This method is implemented according to the invention using a system comprising a digital processor, storage means connected to the digital processor, prompt means controlled by the digital processor for prompting a caller to speak a password beginning with a first digit and ending with a last digit thereof, speech processing means controlled by the digital processor for effecting a multistage data reduction process and generating resultant voice recognition and voice verification parameter data, and voice recognition and verification decision routines. The storage means includes a read only memory for storing voice recognition feature transformation data and voice recognition class reference data both derived from a first plurality (e.g., 1000) of training speakers over a telephone network. The ROM also stores voice verification feature transformation data derived from a second plurality (e.g., 100-150) of training speakers over a telephone network. The voice recognition feature transformation and class reference data and the voice verification feature transformation data are derived in off-line training procedures. The storage means also includes a database of voice verification class reference data comprising data derived from users authorized to access the services.

The voice recognition routine comprises transformation means that receives the speech feature data generated for each digit and the voice recognition feature transformation data and in response thereto generates voice recognition parameter data for each digit. A digit decision routine receives the voice recognition parameter data and the (digit-relative) voice recognition class reference data and in response thereto generates an output indicating the digit. The voice recognition routine may also include a password validation routine responsive to entry of the last digit of the password for determining if the password is valid.

The voice verification routine is controlled by the digital processor and is responsive to a determination that the password is valid for determining whether the caller is an authorized user. This routine includes transformation means that receives the speech feature data generated for each digit and the voice verification feature transformation data and in response thereto generates voice verification parameter data for each digit. A verifier routine receives the voice verification parameter data and the (speaker relative) voice verification class reference data and in response thereto generates an output indicating whether the caller is an authorized user.

In operation of the method and system of the invention, let us assume that a caller places a call from a conventional calling station telephone to an institution to obtain access to an order-entry service to which the caller has previously subscribed. The caller has also previously enrolled in the voice verification database that includes his or her voice verification class reference data. The institution includes suitable input/output devices connected to the system (or integrally therewith) to interface signals to and from the telephone line. Once the call setup has been established, the digital processor controls the prompt means to prompt the caller to begin digit-by-digit entry of the caller's preassigned password. The voice recognition algorithm processes each digit and uses a statistical recognition strategy to determine which digit (zero through nine and "oh") is spoken. After all digits have been recognized, a test is made to determine whether the entered password is valid for the system. If so, the caller is conditionally accepted. In other words, if the password is valid the system "knows" who the caller claims to be and where the account information is stored.

Thereafter, the system performs voice verification on the caller to determine if the entered password has been spoken by a voice previously enrolled in the voice verification reference database and assigned to the entered password. If the verification algorithm establishes a "match," access to the order-entry service is provided. If the algorithm substantially matches the voice to the stored version thereof, but not within a predetermined acceptance criterion, the system prompts the caller to input additional personal information (e.g., the caller's social security number or birthdate) to further test the identity of the claimed owner of the password. If the caller cannot provide such information, the system rejects the access inquiry and the call is terminated.

Once the caller obtains access to the order-entry service, let us assume that he or she then desires to place an order for a product/service uniquely identified by an alphanumeric string known to the caller. According to another feature of the invention, a method for recognizing such alphanumeric strings is implemented using a special recognition strategy that does not require high individual character recognition accuracy to achieve recognition of the spoken alphanumeric string. In operation, the system prompts the caller to speak each character of a string sought to be recognized, beginning with a first character and ending with a last character. Each character is then captured and analyzed using the speaker independent voice recognition algorithm. The method assigns a recognition distance between each spoken input character and the corresponding letter or digit in the same position within each reference alphanumeric string. After each character is spoken, captured and analyzed, each reference string distance is incremented and the process is continued, accumulating distances for each reference string, until the last character is spoken. The reference string with the lowest cumulative distance is then declared to be the recognized string.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a schematic diagram of a telephone network having a calling station connectable to a digital processing system of a service provider such as a financial institution;

FIG. 2 is a schematic diagram of the digital processing system of FIG. 1 for use in providing speaker independent voice recognition and verification according to the teachings of the present invention;

FIG. 3 is a block diagram of the preferred voice recognition/verification algorithms of this invention;

Similar reference characters refer to similar parts and/or steps throughout the several views of the drawings.

DETAILED DESCRIPTION

Figure 4:
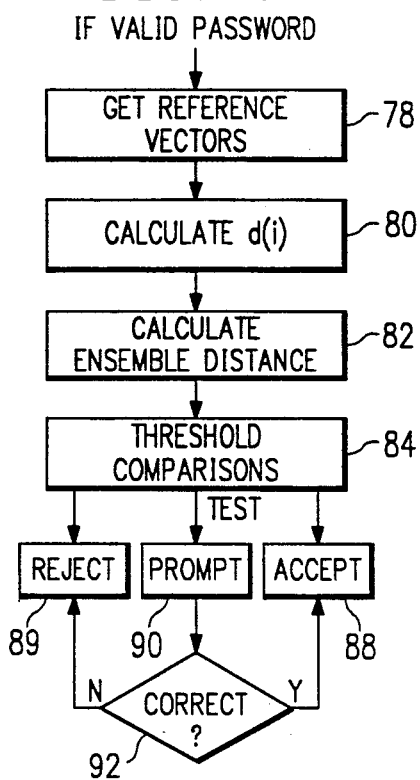
FIG. 4 is a flowchart describing the verifier routine of FIG. 3.

FIG. 1 illustrates a block diagram of a conventional telephone network 10 having a calling station 12 connectable to a digital processing system 14 of a financial institution. According to the teachings of the present invention, the digital processing system 14 includes a speaker-independent voice recognition algorithm 48 and an associated voice verification algorithm 50 to facilitate voice controlled access to one or more services 20 offered by the financial institution. These services include, but are not limited to, account balance inquiry and electronic funds transfer. Moreover, while the following discussion describes the use of voice recognition/verification in the context of accessing information stored in a financial institution, it should be appreciated that the teachings of the invention are not so limited. The invention can be used for numerous other applications such as credit card validation, order-entry of goods/services and personal identification validation. Further, it should also be appreciated that the telephone network may include other devices and switching systems conventional in the art. Accordingly, calling station 12 may be connected through a central office or other switching device, such as an access tandem or interexchange carrier switching system, before connection to the service provider.

Referring now to FIG. 2, a block diagram is shown of the digital processing system 14 of the present invention for providing simultaneous speaker independent voice recognition and verification. The system includes a central processing unit (CPU) 30 for controlling the overall operation of the system. The CPU includes data, address and control buses represented generally by the reference numeral 32. As seen in FIG. 2, the system 14 also includes conventional input/output devices such as a keyboard 34, display terminal 36, speech generator 38 and printer 40. A communications interface 42 (which may be microprocessor controlled) interfaces the system to the telephone line. Random access memory ("RAM") 44 is connected to the CPU by bus 32 for providing temporary storage of data processed thereby. Read only memory ("ROM") 45 is likewise connected to the digital processor for providing permanent storage of special recognition and verification data as will be described below. Disk storage 46 supports control programs including a voice recognition algorithm 48 and a voice verification algorithm 50 as well as suitable control programs (not shown).

According to the invention, ROM 45 stores voice recognition reference information for use by the voice recognition algorithm 48. This information is of two (2) types: voice recognition feature transformation data 52a and voice recognition class reference data 52b derived from a first plurality of training speakers over a telephone network. In particular, voice recognition feature transformation data 52a and voice recognition class reference data 52b is derived, in a prior off-line process, from a voice recognition training database (not shown) including "digit" data from a large number of training speakers (e.g., 1000) collected over the telephone network. This training database 52 includes local and long distance data, and significant amounts of data are collected through carbon button handset microphones and electret handset microphones. The voice recognition class reference data 52b includes a representation for each digit word (e.g., "one," "two," etc.) as a "class" sought to be recognized by the voice recognition algorithm 48. For example, the representation of the class for the digit "one" is derived from the data from all of the training speakers who spoke the digit "one."

The voice recognition training database is thus designed to represent the distribution of acoustic characteristics of each digit word across a large population of speakers. The purpose and effect of the analysis performed on this database is to optimize the parameters of a multiple stage data reduction process so as to discover and accurately represent those characteristics of each digit word that differentiate it from each other digit word, regardless of speaker.

According to another feature of the invention, ROM 45 also supports voice verification feature transformation data 52c. This data is derived, in a prior off line process, from a voice verification training database (not shown). In particular, the voice verification training database preferably includes data generated from approximately 100-150 training speakers and is collected over the telephone network. The database includes local and long distance data, and significant amounts of data are collected through carbon button handset microphones and electret handset microphones. Each training speaker is provided with a script containing random digit sequences. The sequences are spoken in a predetermined number (e.g., 5) of separate recording sessions, with the first recording session containing a predetermined number (e.g., 5) of passes of the digits spoken in random order. The subsequent sessions each contain a predetermined number (e.g., 3) of passes of the digits spoken in random order, and each recording session is separated from the previous session by at least one day.

The voice verification training database is thus designed to represent the distribution of acoustic characteristics of each digit word spoken by a particular training speaker across multiple utterances of the digit word by that speaker. The purpose and effect of the analysis performed on this database is to optimize the parameters of a multiple stage data reduction process so as to discover and accurately represent those characteristics of each digit word uttered by each particular training speaker that differentiate it from the same digit word uttered by each other training speaker.

The voice verification technique requires the authorized users of the system (i.e., those persons expected to call over the telephone system to access information) to have previously enrolled in the system. Accordingly, the system 14 also includes a voice verification reference database 55 comprising voice verification class reference data collected from users authorized to access the services. Enrollment is preferably accomplished by having the user speak a ten digit password five times. For further security, the caller is asked to answer a few factual personal questions that can be answered using digits recognizable by the voice recognition algorithm 48. These questions may include, but need not be limited to, the user's social security number, account number or birthdate. Each "class" of the voice verification class reference data represents an authorized user of the system. The class reference data for all authorized users of the system is then stored in the voice verification reference database 55.

The system 14 also includes a transaction database 56 for storing financial and transaction data, such as account balances, credit information and the like. This information is preferably stored at predetermined locations addressed by the caller's password. Thus the password identifies both the caller and the location of the data sought to be accessed.

In operation of the preferred method, assume a caller places a call from the calling station 12 to the financial institution in order to access account information. The caller has previously enrolled in the voice verification reference database 55. Once the call setup has been established, the speech generator 38 of the digital processing system 14 prompts the caller to begin digit by-digit entry of the caller's predetermined password starting with the first digit and ending with the last digit thereof. Prompting of the digits, alternatively, can be effected in any desired manner or sequence. Signals are interfaced to the telephone line by the communications interface 42. As each digit is spoken, the voice recognition algorithm 48 processes the received information and, as will be described below, uses a statistical recognition decision strategy to determine the digit (zero through nine and "oh").

After all digits have been recognized, a test is made to determine whether the entered password is valid for the system. If the outcome of the test if positive, the caller is conditionally accepted because the system "knows" who the caller claims to be and thus where the account information is stored. Thereafter, the system uses the voice verification algorithm 50 to perform voice verification on the caller to determine if the entered password has been spoken by a voice previously enrolled in the database 55 and assigned to the entered password. If the verification algorithm 50 establishes a "match" within predetermined acceptance criteria, access to the data or other system service is allowed. If the algorithm 50 cannot substantially match the entered voice to a voice stored in the database 55, the system rejects the access inquiry and the call is terminated. If the algorithm 50 substantially matches the entered voice to a voice stored in the database 55, but not within a predetermined acceptance criterion, the system prompts the caller to input additional personal information (e.g., the caller's social security number or account number) associated with the password to further test the identity of the claimed owner of the password. If the caller cannot provide such information, the system rejects the access inquiry and the call is terminated. Correct entry of the requested information enables the caller to gain access to the service.

Referring now to FIG. 3, a block diagram is shown of a preferred embodiment of the voice recognition and verification algorithms 48 and 50. As will be seen, algorithms 48 and 50 share the functional blocks set forth in the upper portion of the block diagram. These blocks comprise a speech processing means for carrying out a first tier of a multistage data reduction process. In particular, as speech is input to the system 14, a feature extractor 60 extracts a set of primary features that are computed in real time every 10 milliseconds. The primary features include heuristically-developed time domain features (e.g., zero crossing rates) and frequency domain information such as Fast Fourier Transform ("FFT") coefficients. The output of the feature extractor 60 is a reduced data set (approximately 4,000 data points/utterance instead of the original approximately 8,000 data points/utterance) and is applied to a trigger routine 62 that captures spoken words using the primary features. The trigger routine is connected to a secondary feature routine 63 for computing "secondary features" from the primary features. The secondary features preferably result from non-linear transformations of the primary features. The output of the routine 63 is connected to phonetic segmentation routine 64. After an utterance is captured and the secondary features are computed, the routine 64 provides automatic phonetic segmentation. To achieve segmentation, the phonetic segmentation routine 64 preferably locates voicing boundaries by determining an optimum state sequence of a two-state Markov process based on a sequence of scalar discriminant function values. The discriminant function values are generated by a two class Fisher linear transformation of secondary feature vectors. The voicing boundaries are then used as anchor points for subsequent phonetic segmentation.

After the phonetic boundaries are located by the phonetic segmentation routine, the individual phonetic units of the utterance are analyzed and so called "tertiary features" are computed by a tertiary feature calculation routine 65. These tertiary features preferably comprise information (e.g., means or variances) derived from the secondary features within the phonetic boundaries. The tertiary features are used by both the voice recognition algorithm 48 and the voice verification algorithm 50 as will be described. The output of the routine 65 is a tertiary feature vector of approximately 300 data points/utterance. As can be seen then, the upper portion of FIG. 3 represents the first tier of the multistage data reduction process which significantly reduces the amount of data to be analyzed but still preserves the necessary class separability, whether digit-relative or speaker relative, necessary to achieve recognition or verification, respectively. The middle portion of FIG. 3 represents a second tier of the data reduction process and, as will be described, comprises the transformation routines 49a and 49b.

To effect speaker independent voice recognition, the tertiary features are first supplied to the voice recognition linear transformation routine 49a. This routine multiplies the tertiary feature vector by the voice recognition feature transformation data (which is a matrix) 52a to generate a voice recognition parameter data vector for each digit. The output of the transformation routine 49a is then applied to a voice recognition statistical decision routine 66a for comparison with the voice recognition class reference data 52b. The output of the decision routine 66a is a yes/no decision identifying whether the digit is recognized and, if so, which digit is spoken.

Specifically, decision routine 66a evaluates a measure of word similarity for each of the eleven digits (zero through nine, and oh) in the vocabulary. The voice recognition class reference data 52b includes various elements (e.g., acceptance thresholds for each digit class, inverse covariances and mean vectors for each class) used by the decision strategy. For a digit to be declared (as opposed to being rejected), certain acceptance criteria must be met. The acceptance criteria may include, but need not be limited to, the following. The voice recognition algorithm determines the closest match between the class reference data and the voice recognition parameter vector for the digit; this closest match is a so called "first choice." The next closest match is a "second choice." Each choice has its own matching score. The digit is declared if (1) the matching score of the first choice is below a predetermined threshold, and (2) the difference between the matching score(s) of the first choice and the second choice digits is greater than another predetermined threshold. When all digits of the password have been recognized, the voice recognition portion of the method is complete.

To effect voice verification, the tertiary features are also supplied to a linear transformation routine 49b that multiplies each tertiary feature vector by the voice verification feature transformation data (which is a matrix). The output of the routine 49b is an $N_p$-element vector p of voice verification parameter data for each digit of the password, with $N_p$ preferably approximately equal to 25. The voice verification parameter data vector p is then input to a verifier routine 66b which also receives the voice verification class reference data 52c for the caller. Specifically, the voice verification class reference data is provided from the voice verification reference database 55. As noted above, the address in the database in the 55 of the caller's voice verification class reference data is defined by the caller's password derived by the voice recognition algorithm 48.

Verifier routine 66b generates one of three different outputs: ACCEPT, REJECT and TEST. An ACCEPT output authorizes the caller to access data from the transaction database 56. The REJECT output is provided if the verifier disputes the purported identity of the caller. The TEST output initiates the prompting step wherein additional follow-up questions are asked to verify the caller's identity.

Referring now to FIG. 4, a flowchart is shown of verifier routine 66b of FIG. 3. By way of background, the routine begins after the determination, preferably by the voice recognition algorithm 48, that the password is valid. Although in the preferred embodiment each voice verification parameter vector is generated as each digit is recognized, it is equally possible to refrain from generating the voice verification parameter vectors until after a test is performed to determine whether the password is valid.

The verifier routine begins at step 78. In particular, the $N_p$-element voice verification parameter vectors for each digit of the spoken password are compared with the previously-generated voice verification class reference data vectors stored in the voice verification reference database 55. First, a weighted Euclidean distance d(i) is computed for it at step 80:

$$d(i) = \left[ \sum_{j=1}^{N_p} w_1(j) (p(i,j) - pr(i,j))^2 \right]^{\frac{1}{2}}$$

where:
p(i,j) is the jth component of the length-Np vector generated from the ith digit in the length-Nd current password entry sequence,
pr(i,j) is the jth component of the reference vector of the ith digit for the alleged enrolled caller,
$w_1$ is a constant weighting vector, precalculated to yield optimum system performance, and
d(i) is the resultant weighted Euclidean distance measure for the ith digit in the current password entry sequence.

The distance vector d is then sorted in ascending order:

$$d(i), \ldots, d(Nd) = \min_{i=1}^{Nd}(d(i)), \ldots, \max_{i=1}^{Nd}(d(i))$$

An ensemble distance is then calculated at step 82 as a weighted combination of these sorted distances:

$$D = \sum_{i=1}^{Nd} w_2(i) \, d(i)$$

where:
d is the sorted distance vector
$w_2$ is another constant weighting vector, precalculated to yield optimum system performance, and
D is the resultant ensemble distance measure for the entire current password entry sequence, with respect to the alleged enrolled caller.

At step 84, the ensemble distance is compared to two (2) acceptance thresholds, an upper threshold and a lower threshold. If the ensemble distance is below the lower acceptance threshold, the test is positive and the caller gains immediate access to the requested service. This is the ACCEPT output 88. If the distance is greater than the upper threshold, the caller's access to the service is denied and the method terminates. This corresponds to the REJECT output 89. If the outcome of the test 84 is between the upper and lower thresholds, the method continues at step 90 by prompting the caller to answer one or more factual questions uniquely associated with the password. This is the TEST output. For example, the caller is requested to speak his/her social security number or his/her account number. Alternatively, the caller can be prompted to enter such identifying information manually through the telephone keypad or by pulling a credit card or the like through a card reader. Of course, the nature and scope of the personal information requested by the system depends entirely on the system operator and the degree of security sought by the caller and operator. A test is then performed at step 92 to determine if the question(s) have been correctly answered. If the outcome of the test is positive, the caller again gains access to the requested service. If the outcome of the test at step 92 is negative, access is denied and the method terminates.

Accordingly, it can be seen that the present invention provides a voice recognition/verification system and method having several advantages over prior art telephone based data access schemes. The problems inherent in the limited frequency response environment of a telephone network are ameliorated through the use of a speaker independent voice recognition system and a voice verification algorithm. The voice verification algorithm is "trained" by a voice verification training database that includes speaker classifications as opposed to word classifications. Moreover, the verification algorithm uses tertiary features and voice verification feature transformation parameters to calculate a preferably 25-element vector for each spoken digit of the entered password. These vectors are then compared with voice verification class reference data (for the caller) and a weighted Euclidean distance is calculated for each digit. An ensemble distance for the entire password is then computed and compared to two acceptance thresholds to determine if the caller's voice matches his or her previously stored voice templates. Callers who "almost match" must get through an additional level of security before access to the data or service is authorized.

The digital processing system of the invention may be, but is not limited to, an IBM AT personal computer which is connected to a local area network for storing and accessing verification reference data. For telephone-based applications requiring confidential access to information, the system 14 has numerous applications. By way of example only, voice verification over the telephone network has significant potential for eliminating calling card fraud. In addition, banks and other financial institutions can provide more security to telephone based account access systems. Presently, banking systems use personal identification numbers or "PIN" digits entered via the telephone keypad to determine eligibility for system entry. Voice verification as well as PIN digits may be employed to determine if a caller is authorized for access to account information. Other uses for the system described above include credit information access, long distance telephone network access, and electronic funds transfer. Because the voice verification operates in conjunction with voice recognition, rotary telephone users are also able to use any automated application employing the system.

The performance of the system is characterized in terms of authorized user rejection rates (type 1 error) and casual imposter acceptance rates (type 2 error). Authorized user rejection needs to be less than 2% for most applications. At the same time, casual imposter acceptance also needs to be kept under 2%. In general, there is a definite tradeoff between these error rates, since raising thresholds to reduce authorized user rejection will always result in increased casual imposter acceptance, and vice versa. Error rates have been determined from a preliminary database containing a mixture of electret and carbon button microphones for individual speakers. In this test, type 1 error rates were below 2% while type 2 error rates were also below 2%. Improved rates are achieved by increasing the size and diversity of the data in the voice verification training database 55.

Figure 5:
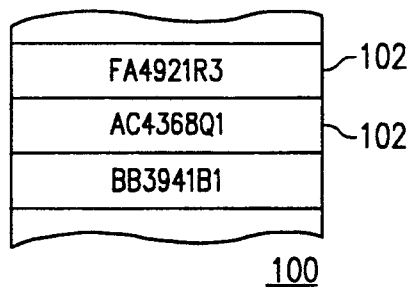
FIG. 5 is a representation of part of a table including alphanumeric strings for use in an order entry system.

As described above, the digital processing system 14 of FIG. 2 can be used for numerous applications. One such application is a telephone order entry system wherein authorized users of the system have the capability of dialing into the system and, following verification as described above, ordering products/services via coded alphanumeric strings. As seen in FIG. 5, for example, the telephone order entry system may comprise a table 100 of alphanumeric strings 102, each identifying a part or component capable of being ordered by the caller over the telephone network via input of an alphanumeric string corresponding to the part or component. As shown in FIG. 5, each alphanumeric string 102 comprises letters of the alphabet and/or the digits "zero" through "nine". For example, one string comprises the characters "FA4921R3." Of course, an alphanumeric string 102 can be composed of only digits, only letters, or a combination of both. The order entry system includes a predetermined finite set of the alphanumeric strings 102.

The class reference data 52b representing the various characters of the alphanumeric strings, as well as the control words "stop" and "clear," are generated according to the teachings described above. In particular, the voice recognition class reference data 52b is expanded to include representations for each character of the recognition vocabulary (the alphabet, the digits "zero" through "nine," "stop" and "clear"). This vocabulary is then used by the voice recognition algorithm 48 for the purpose of automatically recognizing alphanumeric strings that are spoken over the telephone network.

Because such an extensive vocabulary is so difficult to recognize, a special recognition strategy is employed in order to achieve high accuracy. The strategy utilizes an ensemble based recognition approach instead of individual character recognition. In particular, according to this aspect of the present invention, recognition does not occur at the character level. Rather, individual spoken characters are merely captured and analyzed. Once an ensemble of characters (corresponding to an alphanumeric string) is processed in this way, recognition proceeds on the ensemble itself as opposed to any individual characters therein. As will be shown, the strategy thus does not require high individual character recognition accuracy to achieve recognition of the spoken alphanumeric string.

According to the invention, it is assumed that a spoken alphanumeric string is a member of the given finite set of alphanumeric strings previously stored in the database 56 or other suitable storage area. In operation, the identity of the caller desiring access to the order-entry service is preferably first verified according to the methods described in FIGS. 3-4 above. In general, the method for recognizing a spoken alphanumeric string involves determining a recognition distance between each spoken input and the corresponding letter or digit in the same position within each string represented in the database. Each recognition distance is preferably a measure of the acoustic dissimilarity between a spoken input and a hypothetical character. For example, if an "A" is spoken, then the recognition distance for "A" is expected to be quite low. It is also likely that the distances for characters that sound similar to "A", such as "8," "H," "J" and "K," will be higher but also fairly low and that distances for highly dissimilar characters such as "9," "Q" and "W" will be quite high.

Figure 6:
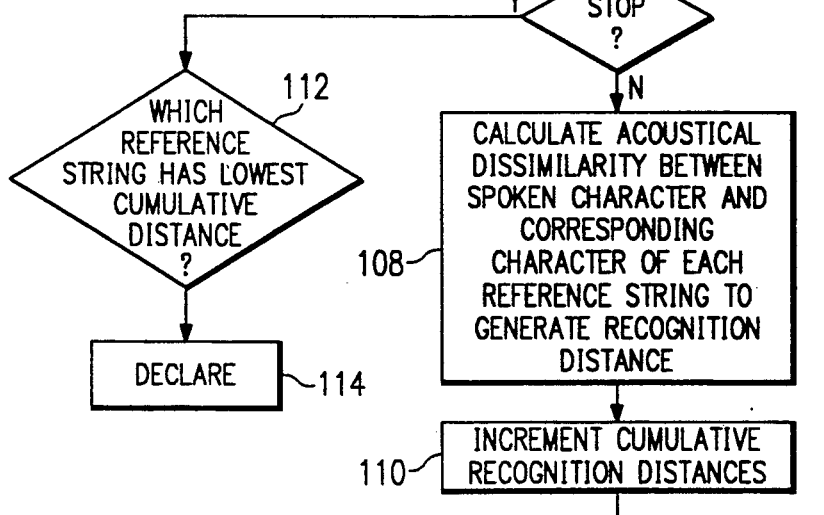
FIG. 6 is a flowchart describing a method of recognizing alphanumeric strings spoken over a telephone network according to the teachings of the present invention.

Referring now to FIG. 6, a flowchart is shown of the preferred embodiment of the method for recognizing alphanumeric strings according to the invention. Each of the predetermined reference alphanumeric strings is presumed to comprise at least two characters that can be either letters, digits, or a combination of letters and digits.

The method begins at step 104 by initializing to zero a cumulative recognition distance for each of the alphanumeric reference strings. At step 105, the caller is prompted to speak an alphanumeric character in an alphanumeric string to be recognized, starting with the first character in the string. The method continues at step 106 to capture and analyze the spoken alphanumeric character. This function is effected by the recognition algorithm 48 as previously described. A test 107 is then performed to determine whether a predetermined command, e.g., "stop," has been spoken. Such a command indicates that all of the characters of the string have already been spoken. If the outcome of test 107 is negative, the method continues at step 108 to calculate a measure of acoustical dissimilarity between the spoken alphanumeric character and a corresponding alphanumeric character of each of the reference alphanumeric strings to generate an initial recognition distance for each of the reference alphanumeric strings. In particular, if the caller speaks the first character of an input string, step 108 compares this character with the first character of each of the reference strings. At step 110, the cumulative recognition distance for each of the reference strings is incremented by the recognition distance calculated in step 108.

The method then returns and repeats steps 105, 106, 107, 108 and 110 for each successive alphanumeric character in the alphanumeric string to be recognized and the corresponding alphanumeric character of each of the reference alphanumeric strings. If at any time during this process the outcome of the test 107 is positive, indicating that all characters of the string have already been spoken, the method performs a test at step 112 to determine which of the reference alphanumeric strings has the lowest cumulative recognition distance. The reference alphanumeric string with the lowest cumulative recognition distance is then assumed at step 114 to be the alphanumeric string spoken by the caller.

If desired, the step 107 can be omitted. For example, if the alphanumeric string to be recognized is of a fixed length, the method can automatically initiate step 112 upon receipt of a predetermined number of characters.

The above described technique has proven to be rather robust even for strings containing only two characters. In general, long strings are easier to recognize than short strings because more information is available to determine which string (from a finite set) is spoken. The size of the string database is important for two reasons. First, for a fixed string length, string accuracy decreases as the size of the database (i.e., the number of possible strings) increases. Second, more computation is required as the database size increases.

It should be noted that individual character recognition accuracy does not need to be uniformly high in order to achieve high string accuracy. For example, if the average substitution rate for the alphanumeric vocabulary is 15% (i.e., 15% of the time a character is individually misrecognized), then for alphanumeric strings with four (4) characters, an average string substitution rate of less than 2% should be achievable.

While the method of FIG. 6 is preferred, the recognition strategy could alternatively be carried out by calculating acoustical similarities between spoken and stored characters and generating recognition values in response thereto. Larger reference values would then be assigned to characters having greater acoustical similarities. Under this approach, the reference string having the highest combined reference value would be declared to be the recognized string. Also, while the method for recognizing alphanumeric strings has been described in the context of an order-entry system following voice verification, the teachings of the invention are not limited to such applications. Indeed, even password verification can be effected using the method if desired.

It should be appreciated by those skilled in the art that the specific embodiments disclosed above may be readily utilized as a basis for modifying or designing other structures or methods for carrying out the same purposes of the present invention. For example, the voice recognition algorithm 48 could alternatively be speaker-dependent instead of speaker-independent as described in the preferred embodiment. It should also be realized by those skilled in the art that such equivalent constructions do not depart from the spirit and scope of the invention as set forth in the appended claims.

What is claimed is:

1. A method, using a processing system, for recognizing character strings spoken by a caller over a telephone network, the processing system including a digital processor, means for interfacing to the telephone network and storage means for storing a predetermined set of reference character strings each having at least two characters, comprising the steps of:
   (a) initializing a cumulative recognition distance for each of the reference character strings to zero;
   (b) prompting the caller to speak a character in a character string to be recognized;
   (c) capturing and analyzing the spoken character;
   (d) calculating a measure of acoustical dissimilarity between the spoken character and a corresponding character of each of the reference character strings to generate a recognition distance for each of the reference character strings;
   (e) incrementing the cumulative recognition distance for each of the reference character strings by the recognition distance generated in step (d);
   (f) repeating steps (b)-(e) for each successive character in the character string to be recognized and a corresponding character of each of the reference character strings;
   (g) determining which of the reference character strings has a lowest cumulative recognition distance; and
   (h) declaring the reference character string with the lowest cumulative recognition distance to be the character string spoken by the caller.

2. The method as described in claim 1 wherein the characters of a reference character string are letters.

3. The method as described in claim 1 wherein the characters of a reference character string are digits.

4. The method as described in claim 1 wherein the characters of a reference character string include both letters and digits.

5. The method as described in claim 1 wherein the step of capturing and analyzing the spoken character uses a speaker-independent voice recognition algorithm and voice recognition class reference data for each character of the string.

6. The method as described in claim 5 further including the step of generating the voice recognition class reference data in an off-line process from a training database of a plurality of training speakers derived over a telephone network.

7. A method, using a processing system, for recognizing character strings spoken by a caller over a telephone network, the processing system including a digital processor, means for interfacing to the telephone network and storage means for storing a predetermined set of reference character strings each having at least two characters, comprising the steps of:
   (a) initializing a combined recognition value for each of the reference character strings to zero;
   (b) prompting the caller to speak a character in a character string to be recognized;
   (c) capturing and analyzing the spoken character;
   (d) calculating a measure of acoustical similarity between the spoken character and a corresponding character of each of the reference character strings to generate a recognition value for each of the reference character strings;
   (e) incrementing the combined recognition value for each of the reference character strings by the recognition value generated in step (d);
   (f) repeating steps (b)-(e) for each successive character in the character string to be recognized and a corresponding character of each of the reference character strings;
   (g) determining which of the reference character strings has a highest combined recognition value; and
   (h) declaring the reference character string with the highest combined recognition value to be the character string spoken by the caller.

8. A method, using a processing system, for recognizing alphanumeric strings spoken by a caller over a telephone network, the processing system including a digital processor, means for interfacing to the telephone network and storage means for storing a predetermined set of reference alphanumeric strings each having at least two characters, comprising the steps of:
   (a) initializing a cumulative recognition distance for each of the reference alphanumeric strings to zero;
   (b) prompting the caller to speak a first alphanumeric character in an alphanumeric string to be recognized;
   (c) capturing and analyzing the spoken first alphanumeric character;
   (d) calculating a measure of acoustical dissimilarity between the spoken first alphanumeric character and a first alphanumeric character of each of the reference alphanumeric strings to generate a recognition distance for each of the reference alphanumeric strings;
   (e) incrementing the cumulative recognition distance for each of the reference alphanumeric strings by the recognition distance generated in step (d);
   (f) prompting the caller to speak a second alphanumeric character in the alphanumeric string to be recognized;
   (g) capturing and analyzing the spoken second alphanumeric character;
   (h) calculating a measure of acoustical dissimilarity between the spoken second alphanumeric character and a second alphanumeric character of each of the reference alphanumeric strings to generate a recognition distance for each of the reference alphanumeric strings;

(i) incrementing the cumulative recognition distance for each of the reference alphanumeric strings by the recognition distance generated in step (h);

(j) determining which of the reference alphanumeric strings has a lowest cumulative recognition distance; and (k) declaring the reference alphanumeric string with the lowest cumulative recognition distance to be the alphanumeric string spoken by the caller.

9. The method as described in claim 1 further including the step of determining whether all of the characters of the string to be recognized have been spoken by the caller prior to step (d).

10. The method as described in claim 7 further including the step of determining whether all of the characters of the string to be recognized have been spoken by the caller prior to step (d).

* * * * *